United States Patent [19]

Edoardo

[11] Patent Number: 4,658,460

[45] Date of Patent: Apr. 21, 1987

[54] BRUSH FOR A WASHING ROLLER

[76] Inventor: Favagrossa Edoardo, Roncadello, Italy

[21] Appl. No.: 761,141

[22] Filed: Aug. 1, 1985

[30] Foreign Application Priority Data

Mar. 7, 1985 [IT] Italy .............................. 21027/85[U]

[51] Int. Cl.⁴ ............................ A46B 3/16; A46B 9/02
[52] U.S. Cl. .................................. 15/182; 15/53 AB; 15/196; 15/DIG. 2; 15/DIG. 5
[58] Field of Search .................. 15/182, 179, 186–188, 15/195–199, 204, 205, 201, 53 A, 53 B, 53 AB, DIG. 5, DIG. 2

[56] References Cited

U.S. PATENT DOCUMENTS

| | | | |
|---|---|---|---|
| 2,357,892 | 9/1944 | Grant | 15/182 X |
| 2,754,531 | 7/1956 | Rowland | 15/183 |
| 3,167,800 | 2/1965 | Mundo | 15/179 |
| 3,199,134 | 8/1965 | Jones | 15/182 X |
| 3,237,233 | 3/1966 | Adams | 15/182 |
| 3,518,819 | 7/1970 | Schneider et al. | 15/179 X |
| 3,643,282 | 2/1972 | Lechene et al. | 15/179 |

Primary Examiner—Peter Feldman
Attorney, Agent, or Firm—Bucknam and Archer

[57] ABSTRACT

A brush for a washing roller for use in an automatic motor vehicle washing installation or the like, comprises a flexible rectangular backing element (2) having means (3,4) along each of two opposite parallel edges for joining these edges together to hold the backing element (2) in a cylindrical configuration. Over the surface of the backing element (2) there are a plurality of sockets (5) for receiving fibres (10) fixed to the backing element by a sewing thread (11). One or a plurality of strip-like zones inclined diagonally with respect to the rectangular shape of the backing element (2) is or are provided with fibres (10) of a greater length such that when the backing element (2) is curved into its cylindrical configuration the strip-like zones with longer fibres form a helix over the surface of the roller thus formed.

1 Claim, 6 Drawing Figures

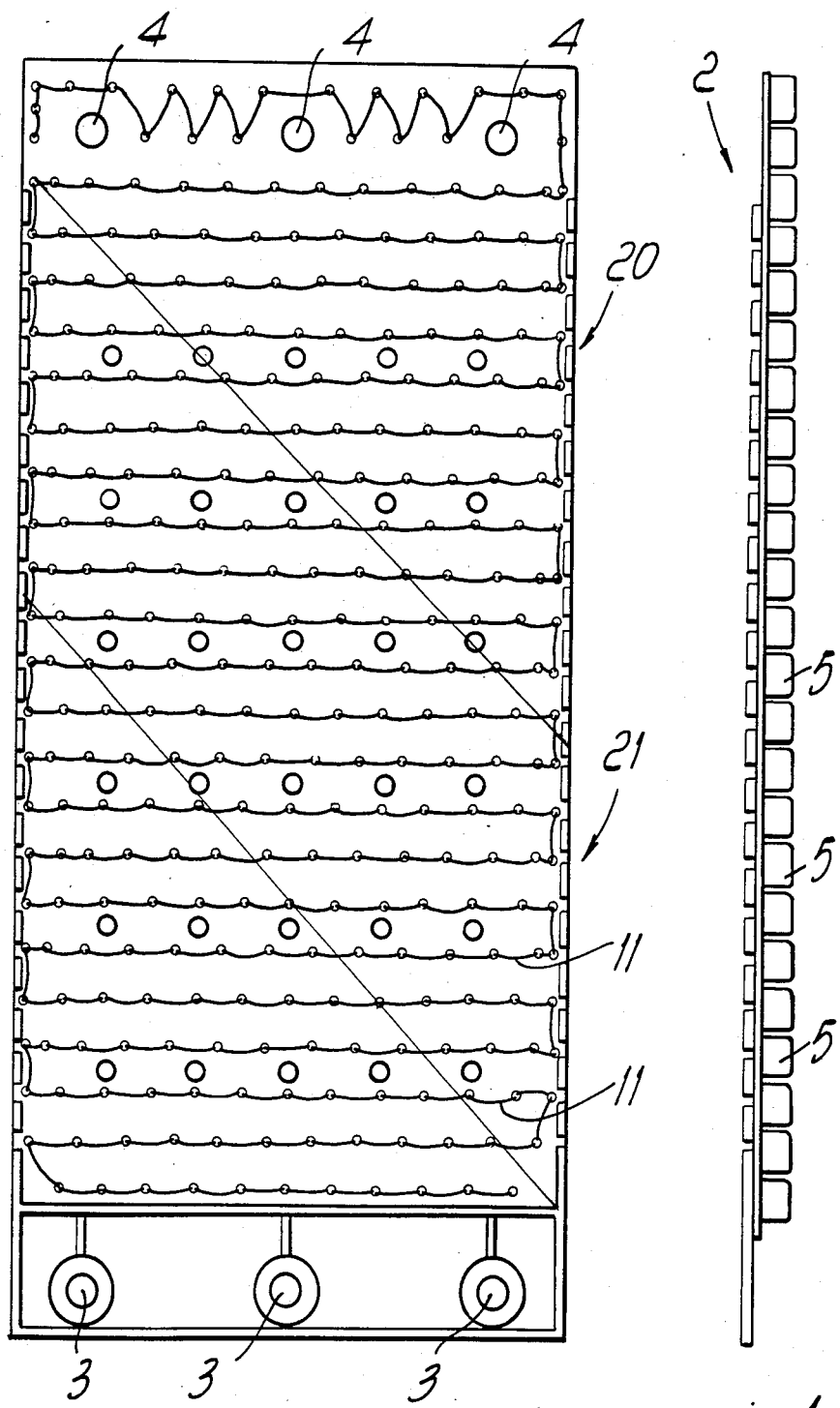

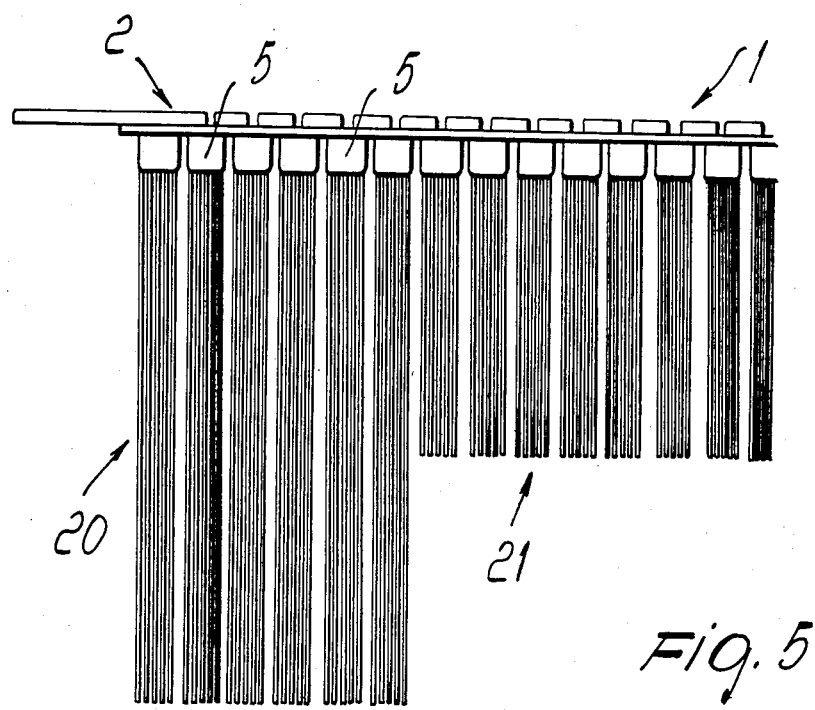
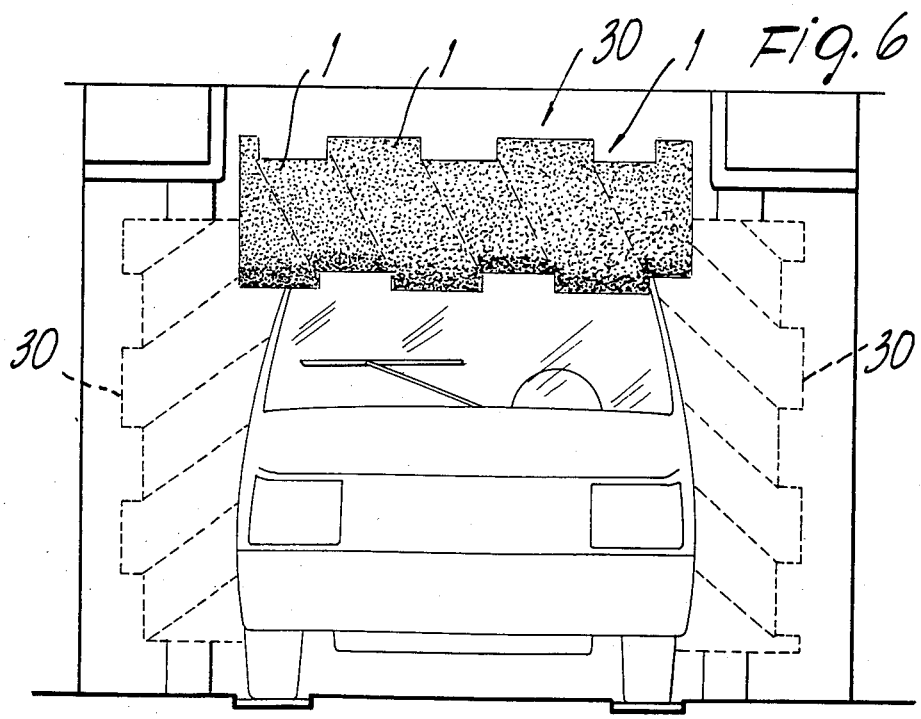

BRUSH FOR A WASHING ROLLER

The present invention relates to a brush for a washing roller, and particularly to a brush for an automatic vehicle washing installation.

As is known, washing rollers, which are used in motor vehicle washing installations, generally have brushes with very long tufts which extend radially from a core or shaft in such a way that the free ends of the tufts define a substantially cylindrical surface. The tufts of such brushes are formed by groups of synthetic fibres which serve the function of performing a mechanical rubbing or wiping on the motor vehicle body for removal of the dirt.

When washing rollers are put into rotation the tufts or fibres all lie substantially radially of the core due to the action of the centrifugal force, and thus exert a constant rubbing action on the surfaces of a motor vehicle being washed. The installation also delivers water and/or detergent to the area so that the combined action of the water jets and the washing rollers removes the dirt and cleans the vehicle. With the currently utilised brush configurations, however, it is not possible to reach right to the most remote interstices of the motor vehicle from which the dirt, and in particular particles of dust, soil and the like, are not removed. Moreover, in many cases the solid particles of dirt are not removed by the rubbing action by the roller, and remain on the bodywork of the motor vehicle, constituting an abrasive element which, with the passage of time can damage the paintwork of the motor vehicle body.

The present invention seeks to overcome the previously indicated disadvantages by providing a new type of brush designed for washing rollers for motor vehicle washing installations in general, which will have a much more effective action on dirt particles on a vehicle body thus obtaining, as well as a better washing action, also an action which avoids damage to the motor vehicle body itself. This is achieved because the brush of the present invention is shaped in such a way as to be able to reach even the most inaccessible parts of the motor vehicle body, thus effecting a complete and effective cleaning of the motor vehicle.

According to the present invention there is provided a brush for a washing roller, for use in an automatic motor vehicle washing installation or the like, characterised by the fact that it comprises a flexible laminar backing element having a plurality of sockets for receiving groups of fibres forming the bristles of the brush, at least one strip zone of the backing element being provided with groups of fibres having a greater length than the groups of fibres fitted to the remaining area or areas of the backing element, the flexibility of the backing element being such that it can be curved into a cylindrical form with the fibres directed radially outwardly, to form a washing roller.

One advantage of a brush for a washing roller formed as an embodiment of the present invention is that it is able to offer the widest guarantees of reliability and security in use.

Another advantage of the present brush for washing rollers, is that whilst presenting significantly improved characteristics, it can be made at a cost substantially similar to that of the traditional type of brushes.

One embodiment of the present invention will now be more particularly described, by way of example, with reference to the accompanying drawings, in which:

FIG. 1 is a schematic side view of a sheet like element from which a brush of the invention is to be made;

FIG. 2 is a rear view of the sheet like element of FIG. 1;

FIG. 5 is a partial side elevation of a brush according to the invention; and

Figure 3:
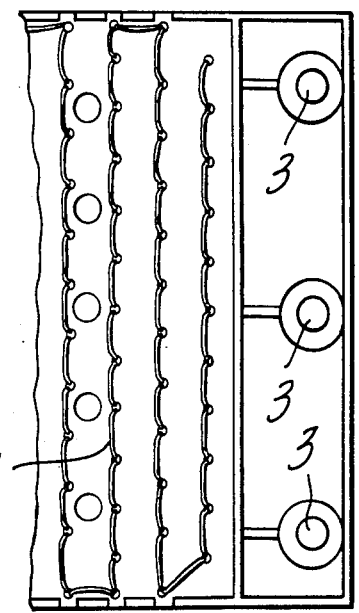
FIG. 3 is a view similar to FIG. 2, showing an end portion of the flexible sheet like element.

FIG. 6 schematically illustrates a washing roller which can be made from a brush similar to that illustrated in the preceding Figures.

Referring now to the drawings, a brush for a washing roller such as that generally indicated with the reference numeral 1 in FIG. 6, comprises a flexible laminar backing element 2 which, advantageously, is made in rubber or in a sutable plastics material, such that the backing element 2 has a certain flexibility which allows it to be curved into a cylindrical configuration.

As can be seen in FIGS. 2 and 3, the flexible element 2 has a rectangular elongate outline and, at one end, is provided with openings 3 which, when the element is curved into a cylindrical shape, can be aligned with corresponding holes 4 provided at the other end to allow the element to be fixed in the desired cylindrical configuration such as by screws, rivets or similar elements.

Figure 4:
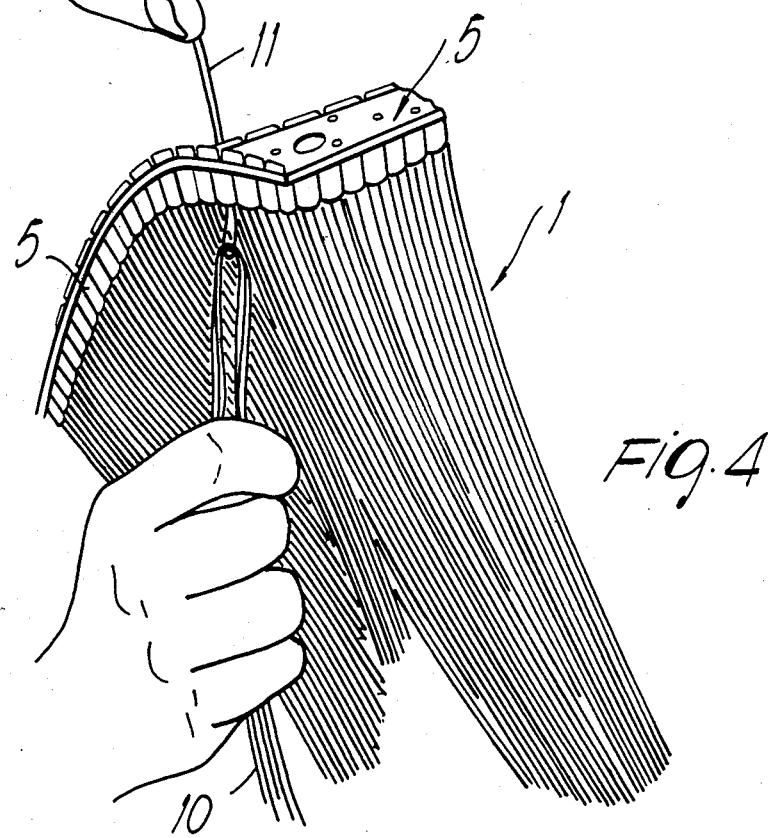
FIG. 4 is a perspective view showing the application of groups of fibres to the sheet like element to form a brush.

On its face which will be outermost when the element 2 is curved into a cylinder it has a plurality of sockets 5 which are uniformly distributed over the surface and disposed in diagonal alignment with one another. Groups of synthetic fibres, indicated 10, can be inserted into the sockets 5 as shown in FIG. 4, and these fibres advantageously are made of polyethylene or similar mixtures which are folded in half and joined to the backing element 2 at a mid portion by a sewing thread 11 which binds all the groups of fibres together thus obtaining the desired compactness and uniformity determined also by the fact that each group has always the same number of fibres.

In accordance with the invention at least one strip zone of the said groups of fibres is made up with fibres which have a greater length than the remaining parts. In FIG. 2 the diagonal lines indicate the boundaries of a strip in which the longer fibres are fitted. In other embodiments a plurality of such strips are disposed inclined with respect to the longitudinal axis of the sheet like element 2, and FIG. 6 illustrates a roller made with three such diagonal strips so arranged that when the backing element is curved into a cylindrical configuration the longer strips form a continuous helix for three turns around the cylindrical surface as can be seen in FIG. 6. As shown in FIGS. 5 and 6, the washing roller has a crenellated—longitudinal edge longitudinal cross-section.

In the embodiment of FIG. 2, the diagonal lines on the backing element 2 indicate the boundaries between zones 20 at each end, which are to be fitted with fibres of greater length, and zone 21 which has fibres of a shorter length. In practice, however many diagonal zones may be provided, the fibres of greater length cover substantially about 50% of the circumferential development of the brush.

By providing strips with longer fibres in zones extending along an inclined direction with respect to the longitudinal axis of the sheet like backing element 2 the washing rollers 30 formed upon curving such backing sheets 2 into a cylinder have fibres of greater length over an area with a cylindrical helical conformation which extends over the whole of the axial length of the roler itself. The presence of longer fibres with a cylindrical helical disposition gives the possibility of creating, during the washing of the motor vehicle, a component of movement which displaces the dirt particles along an axial direction with respect to the washing roller, therefore encouraging more thorough removal of all the particles of dirt from the motor vehicle body.

Moreover, the presence of groups of fibres of greater length allows a better penetration into the more inaccessible recesses of the motor vehicle body during washing, thereby effecting an efficient and complete removal of dirt. It is to be emphasised that a brush in which fibres of greater length are provided in a configuration which allows the creation of a cylindrical helical conformation on a washing roller formed thereby, acts in use to create a component of movement on the dirt particles which tends to loosen and remove the dirt particles from the surface of the motor vehicle in a more effective manner than with rollers having fibres which are all of the same length. In fact, since the longer fibres are disposed in a cylindrical helix, a wiping action on the particles is obtained along the axial direction of the roller and, therefore, the dirt particles are separated rapidly and with ease. Moreover, by having some fibres with a greater length their introduction into the less accessibe parts of the motor vehicle body is facilitated.

I claim:

1. A brush for a washing roller, for use in an automatic motor vehicle washing installation or the like, comprising a flexible laminar backing element having a plurality of sockets for removably receiving groups of fibres forming the bristles of said brush, a strip zone of said backing element being provided with groups of fibres having a greater length than the groups of fibres fitted to the remaining areas of said backing element, the flexibility of said backing element being such that it can be curved into a cylindrical form, said backing element being substantially rectangular and said strip zone for receiving said fibres having a greater length and extending diagonally with respect to said backing element, said fibres being removably fixed to said backing element at a mid part of their longitudinal extent by a sewing thread disposed on the rear face of said backing element, said strip-like zone of fibres of greater length extending helically over the cylindrical surface of said roller, said washing roller having a crenellated-longitudinal edge longitudinal cross-section and the pitch of the helix defined of said fibers of greater length being such as to provide, as said washing roller is rotated, a component of force effective to progressively displace the dirt particles along an axial direction with respect to said washing roller.

* * * * *